Dec. 4, 1951  H. R. HAYES  2,576,935
SPRING SUSPENSION FOR VEHICLES
Filed April 14, 1950
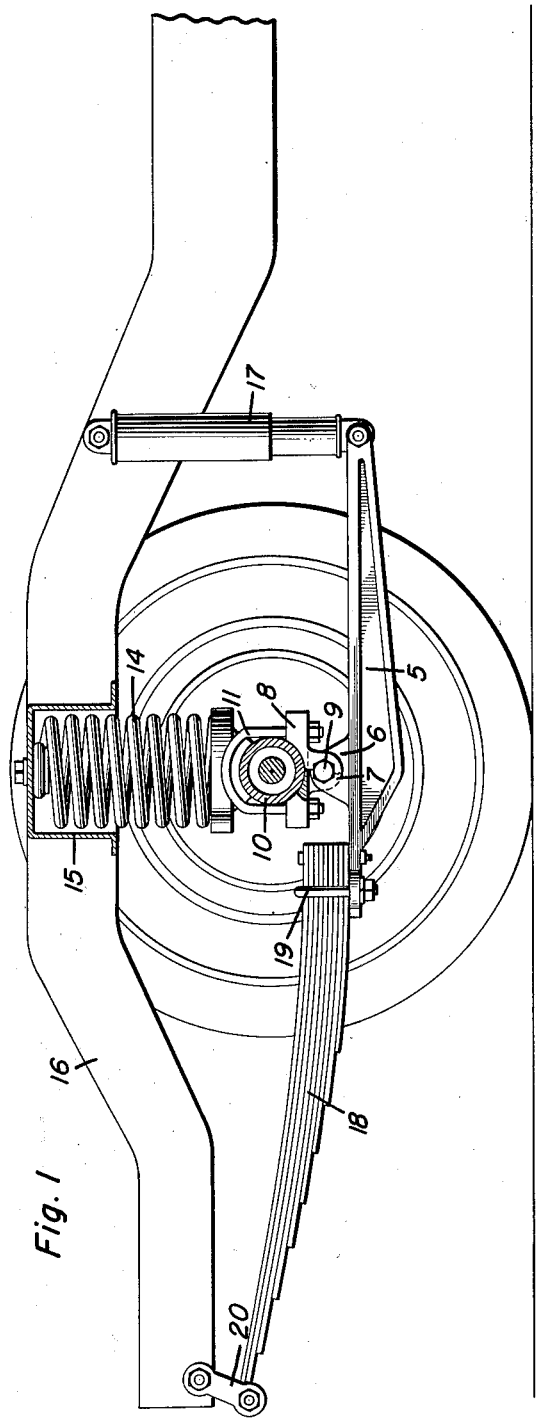
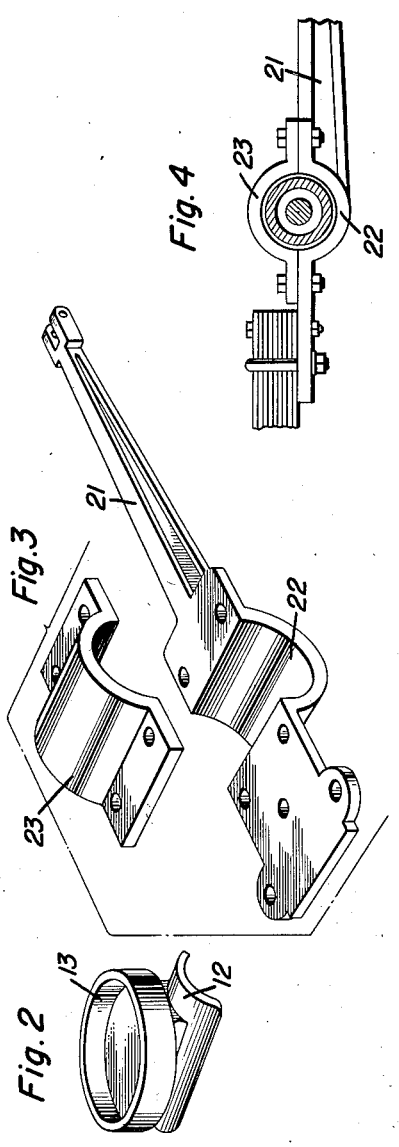
Harold R. Hayes
INVENTOR.

Patented Dec. 4, 1951

2,576,935

UNITED STATES PATENT OFFICE 2,576,935

SPRING SUSPENSION FOR VEHICLES

Harold R. Hayes, Saranac, N. Y.

Application April 14, 1950, Serial No. 155,961

3 Claims. (Cl. 267—16)

The present invention relates to new and useful improvements in spring suspensions for motor vehicles and more particularly to an overload spring rockably mounted on the vehicle axle.

An important object of the invention is to provide a rigid arm rockably mounted at a point intermediate its ends on the axle of the vehicle to function as a lever and with spring means connecting one end of the arm to the vehicle frame and with shock absorbing means connecting the other end of the arm to the frame of the vehicle.

A further object is to provide a spring suspension of simple and practical construction, which is strong and durable, efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view with parts shown in section;

Figure 2 is a perspective view of the upper saddle plate provided with a socket for a coil spring;

Figure 3 is a group perspective view of a modified construction of the rigid arm of the spring provided with a split bearing for mounting on the axle, and Figure 4 is a fragmentary side elevational view of the modification shown in Figure 3.

Referring now to the drawings in detail, and first with respect to the form of the invention illustrated in Figures 1 and 2, the numeral 5 designates a rigid spring suspension arm or lever which is formed at its upper side adjacent one end with an apertured lug 6 positioned between a pair of spaced apart apertured lugs 7 at the underside of a lower saddle plate 8. The lugs 6 and 7 are pivoted to each other by a bolt and nut, pin or the like 9 for rockably connecting the arm to the saddle.

The lower saddle plate 8 is secured to the underside of a vehicle axle 10 by means of U-bolts 11 placed over the ends of an upper arcuate saddle plate 12 held in position on the axle 10 by the U-bolt.

A cup-shaped socket 13 is formed on the upper saddle plate 12 for receiving the lower end of a coil spring 14 which has its upper end secured in a socket 15 secured to a vehicle frame to represent a regular or companion spring on the vehicle.

A shock absorber 17 of conventional construction and which may be of a hydraulic or spring type, or a combination of both, pivotally connects the front end of arm or lever 5 to the vehicle frame 16 and a leaf spring 18 is connected at its front end to the rear end of arm or lever 5 by a U-bolt 19 and is connected at its rear end to the frame 16 by a conventional spring shackle 20.

In the form of the invention illustrated in Figures 3 and 4 the rigid arm or lever is shown at 21 and is formed adjacent its rear end with a semi-cylindrical bearing section 22 to which a companion bearing plate 23 is attached for clamping to a vehicle axle with sufficient freedom to permit rocking movement of the arm or lever 21. The front and rear ends of the arm or lever 21 are connected to the vehicle frame in the manner as heretofore described.

The combined rigid lever and leaf spring construction, when mounted on a vehicle in the manner illustrated and described, and used with a companion coil or other type spring 14, will act as an overload spring, shock absorber, and stabilizer.

Having described the invention, what is claimed as new is:

1. A spring suspension for vehicles comprising a rigid lever, means rockably supporting the lever adjacent one end to a vehicle axle, a shock absorber connecting one end of the lever to a vehicle frame, and a leaf spring connecting the other end of the lever to the frame.

2. A spring suspension for vehicles comprising a rigid lever, a saddle pivoted on top of the lever adjacent one end for attaching to a vehicle axle, a shock absorber connecting one end of the lever to a vehicle frame, and a leaf spring connecting the other end of the lever to the frame.

3. A spring suspension for vehicles comprising a rigid lever, a lower split bearing section integrally formed adjacent one end of the lever, an upper split bearing section attached to the lower section for rockably clamping the lever on a vehicle axle, a shock absorber connecting one end of the lever to a vehicle frame, and a leaf spring connecting the other end of the lever to the frame.

HAROLD R. HAYES.

REFERENCES CITED

The following references are of record in the file of this patent:

UNITED STATES PATENTS

| Number | Name | Date |
|---|---|---|
| 850,073 | Stolp | Apr. 9, 1907 |
| 1,048,336 | Neuberth | Dec. 24, 1912 |
| 1,061,310 | Moore | May 13, 1913 |
| 2,301,398 | Haynes | Nov. 10, 1942 |